US008990833B2

(12) United States Patent
Kuesel et al.

(10) Patent No.: US 8,990,833 B2
(45) Date of Patent: Mar. 24, 2015

(54) INDIRECT INTER-THREAD COMMUNICATION USING A SHARED POOL OF INBOXES

(75) Inventors: Jamie R. Kuesel, Rochester, MN (US); Mark G. Kupferschmidt, Rochester, MN (US); Paul E. Schardt, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 13/330,850

(22) Filed: Dec. 20, 2011

(65) Prior Publication Data

US 2013/0160026 A1 Jun. 20, 2013

(51) Int. Cl.
*G06F 9/54* (2006.01)
*G06F 15/76* (2006.01)

(52) U.S. Cl.
CPC .................................. *G06F 9/546* (2013.01)
USPC .......................................... 719/313; 718/102

(58) Field of Classification Search
None
See application file for complete search history.

(56) References Cited

U.S. PATENT DOCUMENTS

| 7,490,218 | B2 | 2/2009 | Eggers et al. |
| 7,814,243 | B2 | 10/2010 | Hamilton |
| 7,853,777 | B2 | 12/2010 | Jones et al. |
| 7,991,977 | B2 | 8/2011 | Hass et al. |
| 7,991,978 | B2 | 8/2011 | Kuesel et al. |
| 2004/0252686 | A1* | 12/2004 | Hooper et al. ............... 370/389 |
| 2008/0263339 | A1* | 10/2008 | Kriegel et al. ............... 712/228 |
| 2008/0307422 | A1* | 12/2008 | Kurland et al. ............... 718/102 |
| 2009/0183167 | A1 | 7/2009 | Kupferschmidt et al. |
| 2009/0231348 | A1 | 9/2009 | Mejdrich et al. |
| 2009/0249356 | A1 | 10/2009 | He et al. |
| 2009/0282227 | A1* | 11/2009 | Hoover et al. ............... 712/227 |

(Continued)

FOREIGN PATENT DOCUMENTS

| GB | 2463142 B | 3/2010 |
| WO | 2010062916 A1 | 6/2010 |

OTHER PUBLICATIONS

BenJamin C Ling et al. "Session State: Beyond Soft State", 2004, 15 pages.*

(Continued)

*Primary Examiner* — Charles E Anya
*Assistant Examiner* — Abdou Seye
(74) *Attorney, Agent, or Firm* — Wood, Herron & Evans, LLP

(57) ABSTRACT

A circuit arrangement, method, and program product for communicating data between hardware threads of a network on a chip processing unit utilizes shared inboxes to communicate data to pools of hardware threads. The associated hardware in the pools threads receive data packets from the shared inboxes in response to issuing work requests to an associated shared inbox. Data packets include a source identifier corresponding to a hardware thread from which the data packet was generated, and the shared inboxes may manage data packet distribution to associated hardware threads based on the source identifier of each data packet. A shared inbox may also manage workload distribution and uneven workload lengths by communicating data packets to hardware threads associated with the shared inbox in response to receiving work requests from associated hardware threads.

22 Claims, 11 Drawing Sheets

(56) References Cited

U.S. PATENT DOCUMENTS

| | | | |
|---|---|---|---|
| 2009/0307714 A1* | 12/2009 | Hoover et al. | 719/314 |
| 2010/0189111 A1* | 7/2010 | Muff et al. | 370/400 |
| 2010/0191814 A1 | 7/2010 | Heddes et al. | |
| 2010/0220742 A1* | 9/2010 | Brewer et al. | 370/412 |
| 2010/0333099 A1 | 12/2010 | Kupferschmidt et al. | |

OTHER PUBLICATIONS

Erik Lindholm et al "NVIDIA Tesla: A Unified Graphics and Computing Architecture", 2008, IEEE, p. 39-55.*

Ram Rangan, "Pipelined Multithreading Transformations and Support Mechanisms," Dissertation, Princeton University, Jun. 2007.

* cited by examiner

INDIRECT INTER-THREAD COMMUNICATION USING A SHARED POOL OF INBOXES

FIELD OF THE INVENTION

The invention is generally related to data processing in a computing system including a plurality of interconnected processing blocks (i.e., nodes), and in particular to processor architectures and communication architectures incorporated therein.

BACKGROUND

A network on a chip (NOC) is a novel integrated circuit architecture that applies a network-based architecture to a single chip to create a unique processing unit. A typical NOC includes a plurality of integrated processor (IP) blocks coupled to one another via the network. NOC processing units typically distribute (i.e., allocate) various parts of a job to different hardware threads of one or more IP blocks to be executed by the one or more IP blocks in the NOC processing unit, where the distribution typically includes transmitting data packets including one or more data words between one or more hardware threads of the NOC. With the number of IP blocks in the standard computer systems expected to rise, efficiently handling workload distribution has become increasingly demanding.

In many conventional NOC architecture systems, an inbox/outbox model is used, whereby transmitting data packets is often referred to as "message passing," and conventionally a message (i.e., a data packet) is transmitted from an output buffer (i.e., an "outbox") of a first hardware thread to an input buffer (i.e., an "inbox") of a second hardware thread over the network of the NOC. Such conventional implementations are typically referred to as "direct inter-thread communication" messaging (hereinafter "DITC"). As such, each hardware thread of a DITC implementation includes an inbox and an outbox, and messages passed over the network of the NOC include an address corresponding to the respective destination hardware thread the message is to be passed.

Inboxes and outboxes used in DITC implementations are typically of fixed size, and thus can only buffer a limited number of messages at a time. As a result, if a destination hardware thread is unable to process incoming messages arriving at its inbox at the same rate as the messages are being sent by other, source hardware threads, those source hardware threads may have to wait for the destination hardware thread to catch up, resulting in those source hardware threads operating below maximum efficiency. As such, in conventional systems, a workload distributed between a plurality of hardware threads may become uneven as source hardware threads distributing messages generally address the messages to specific destination hardware threads, and in some cases the source hardware threads must wait on a destination hardware thread to clear enough space in the associated inbox for the messages.

One particular application of a NOC architecture is in connection with software pipelining, where hardware threads disposed in one or more IP blocks are arranged into different stages of a pipeline, and where data is streamed between the stages of the pipeline to perform a sequence of steps on the streamed data. The most efficient operation of a software pipeline is obtained whenever all hardware threads in the pipeline are operating at peak efficiency, so if any stage of a software pipeline is unable to process the data streamed to the stage at the same rate as an earlier stage outputs that data, the earlier stage backs up and operates below peak efficiency. Moreover, workloads may change dynamically, so it is often difficult to predict what the relative workloads of different stages of a pipeline will be from moment to moment, and thus, it can be difficult to maintain all of the stages of a software pipeline operating in an efficient manner.

A continuing need exists in the art for a manner of increasing the efficiency of workload distribution and message passing in computing systems including a plurality of interconnected integrated processor blocks.

SUMMARY OF THE INVENTION

The invention addresses these and other problems associated with the prior art by utilizing shared inboxes to feed pools of hardware threads and thereby provide indirect inter-thread communication between hardware threads in a NOC system. Data packets are communicated from source hardware threads to shared inboxes associated with pools of destination hardware threads, and the destination hardware threads may request data packets for processing by communicating a work request to an associated shared inbox. A source identifier may be inserted into each data packet prior to communication to the shared inbox such that the shared inbox may identify related data packets (i.e., data packets that may require processing by a single hardware thread, also referred to herein as "message groups"). A shared inbox may store data packets of a plurality of message groups from multiple source hardware threads in an intermixed arrangement, while facilitating data packet ordering when communicating data packets to associated hardware threads for processing based at least in part on the source identifiers of each data packet. Furthermore, a shared inbox may lock dependent data packets of a message group in response to a first data packet (i.e., a first message) of the message group being communicated to an associated hardware thread for processing, such that the dependent data packets (i.e., the remaining messages) may only be communicated to the hardware thread processing the first message.

As such, in some embodiments of the invention, workload balancing may be managed by a shared inbox at a point of processing (i.e., loading a data packet into a hardware thread for processing), such that a particular destination thread for a data packet may not be specified or determined when communicating the data packet from the source hardware thread.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

DETAILED DESCRIPTION

Embodiments of the invention provide a circuit arrangement and method for communicating data within a processing unit that includes a plurality of nodes coupled to one another in a network on a chip (NOC) arrangement. The nodes include a plurality of hardware threads, where each hardware thread includes an execution unit for processing data. Shared inboxes may be associated with subsets of the plurality of hardware threads of the NOC system, where the subsets may be referred to as "pools" of hardware threads. Inter-thread communications may utilize data packets (i.e., "messages") communicated to and from the shared inboxes, such that data packets may not be addressed directly to specific hardware threads but to a pool of hardware threads associated with a particular shared inbox. The shared inboxes may receive work requests from any of the hardware threads of the pool associated therewith and communicate data packets to the requesting hardware threads. In some embodiments, a respective shared inbox may be associated with a pool of hardware threads executing the same and/or related software threads, including for example, a pool of hardware threads executing instances of a stage of a software pipeline. As such, a shared inbox may manage workload balancing between hardware threads of an associated pool of hardware threads by communicating data packets to such hardware threads for processing upon request of such hardware threads.

Hardware and Software Environment

Figure 1:
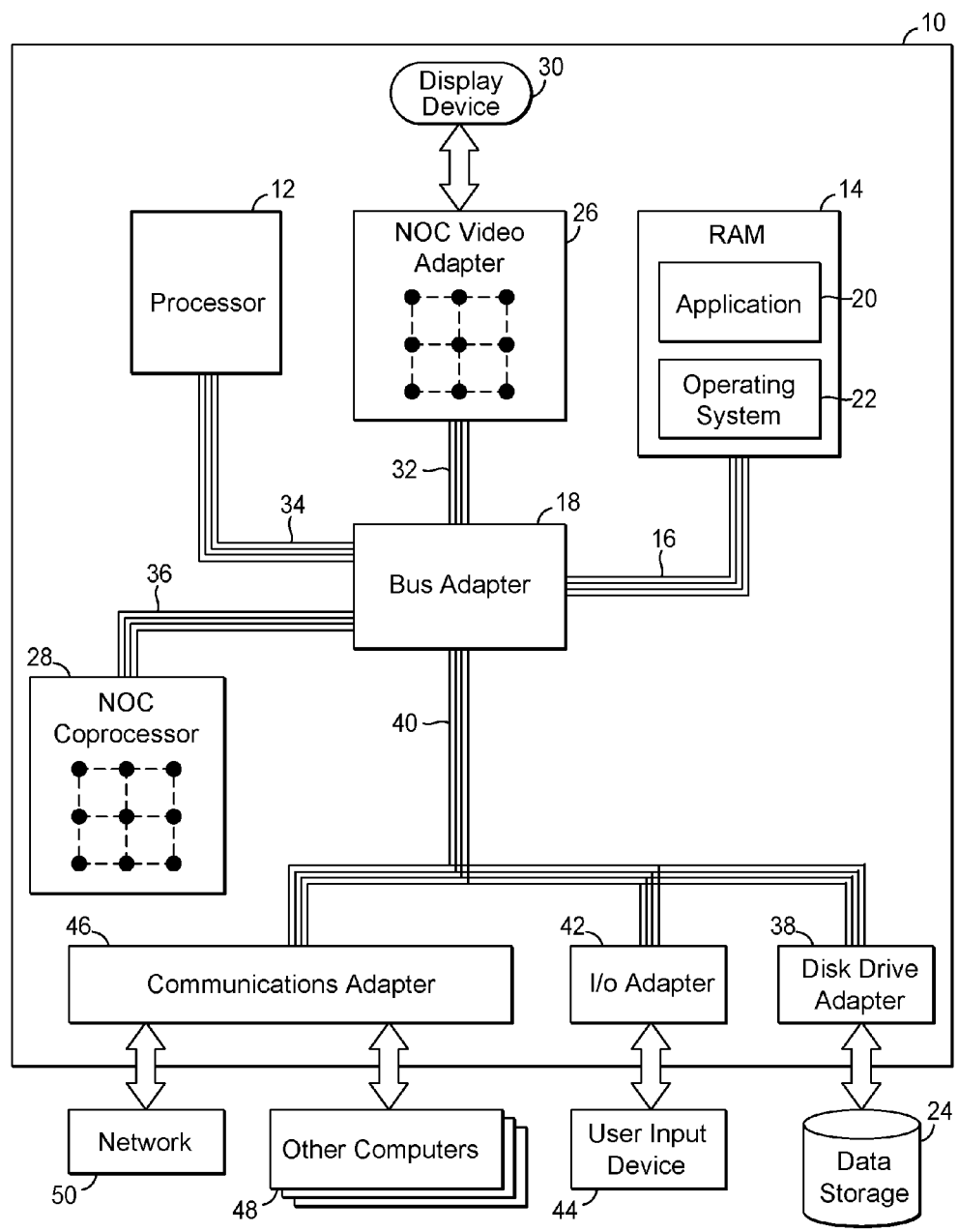
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
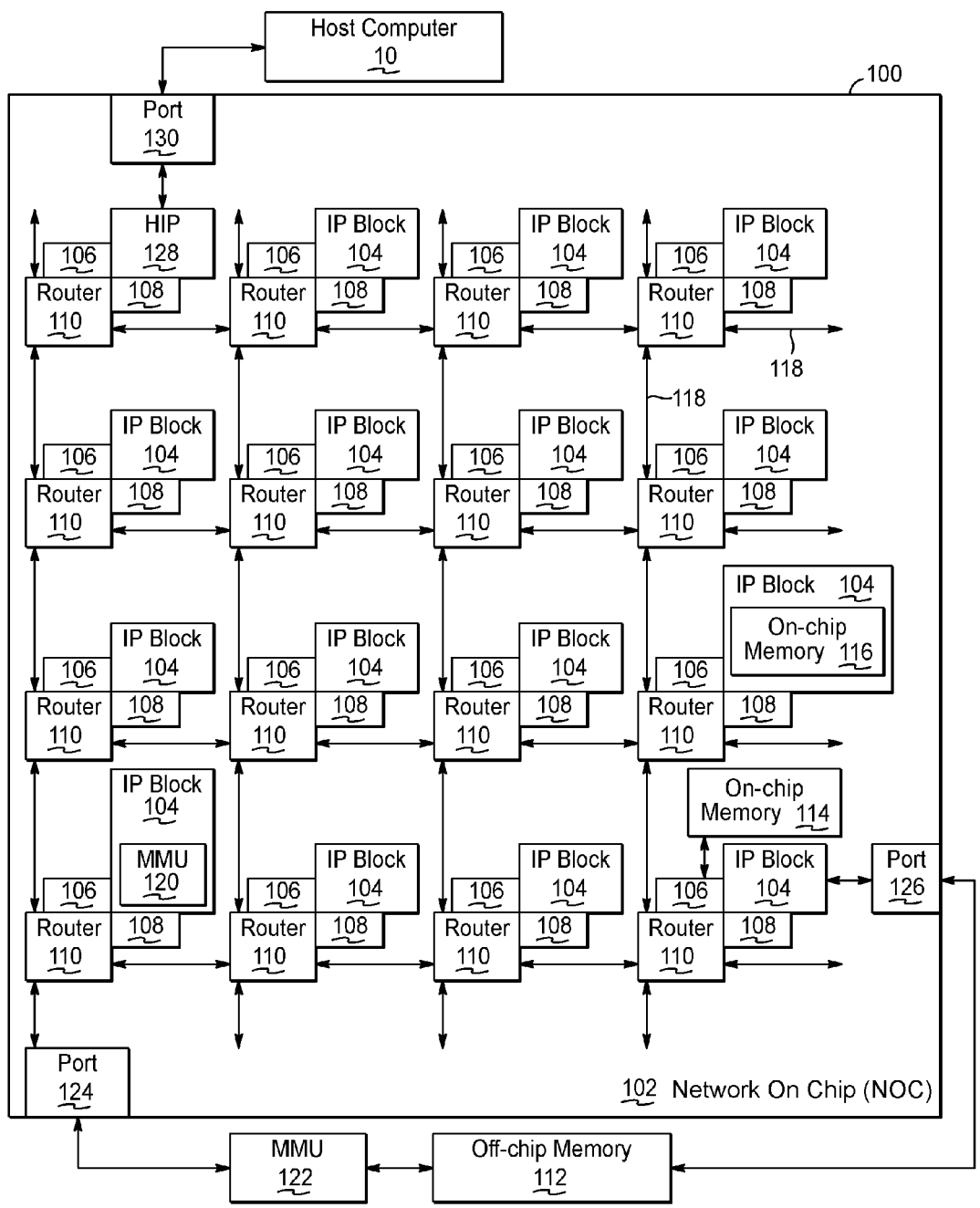
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor (IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
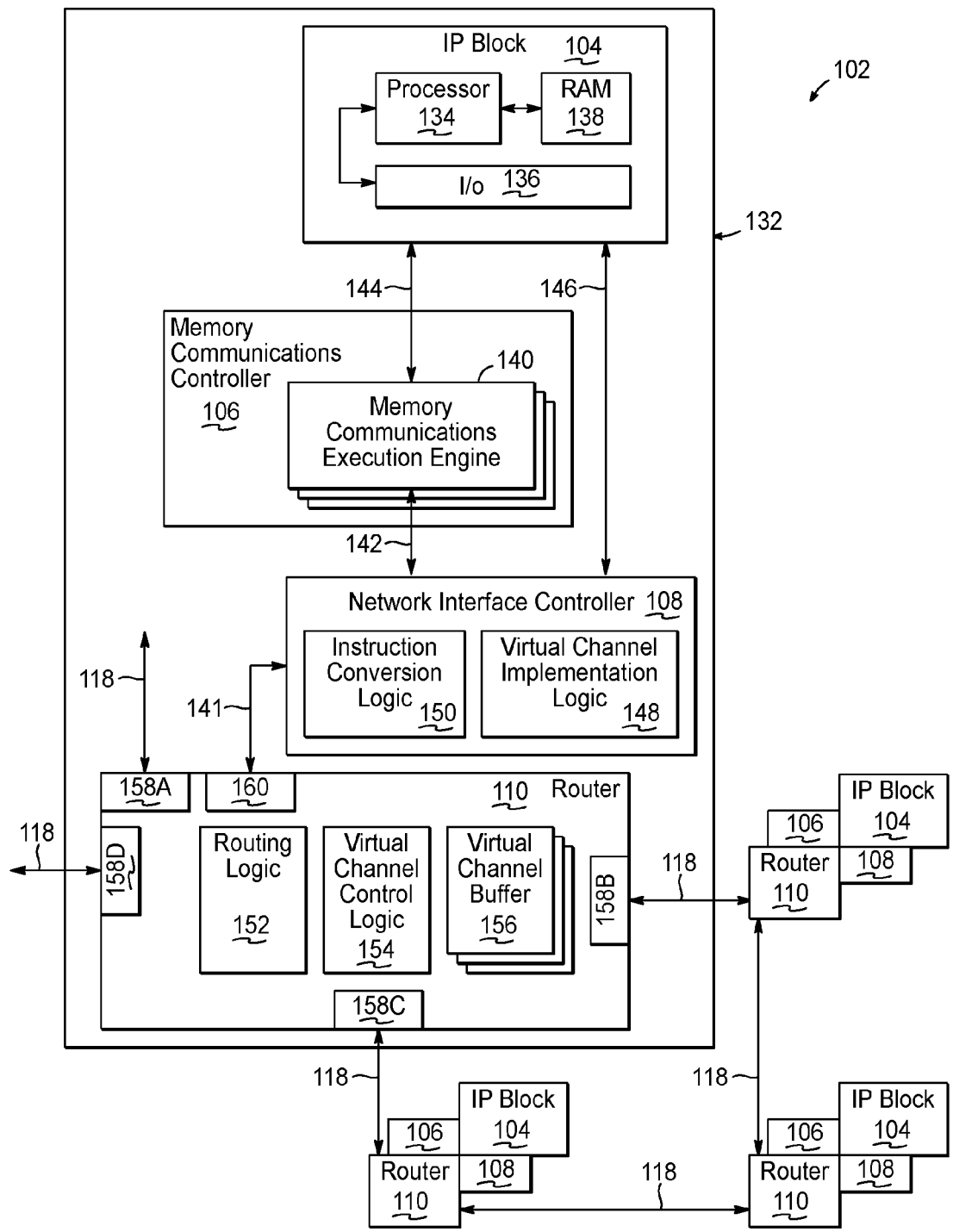
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132 which may be referred to as a node or a hardware thread. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
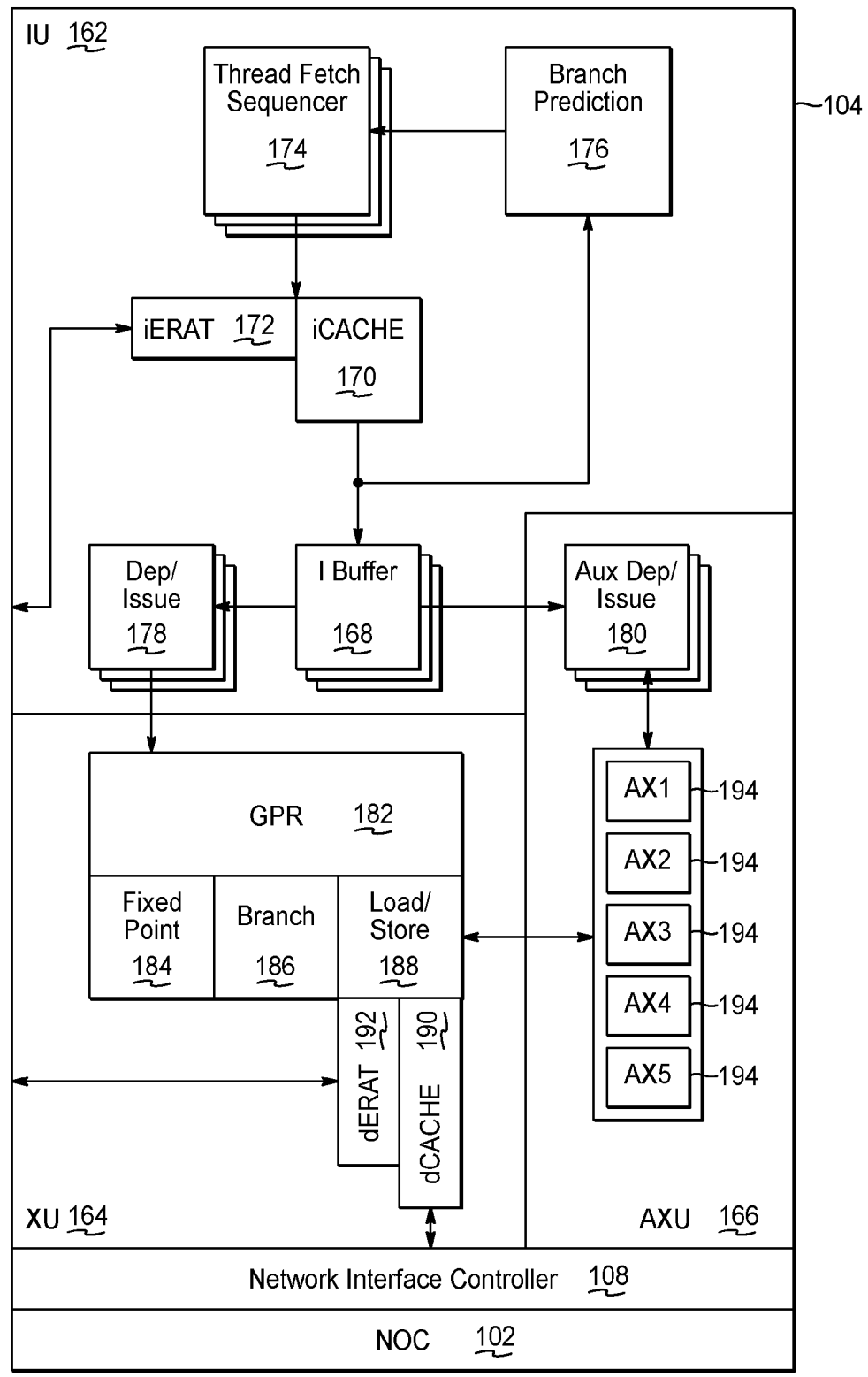
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Software Pipelining

Figure 5:
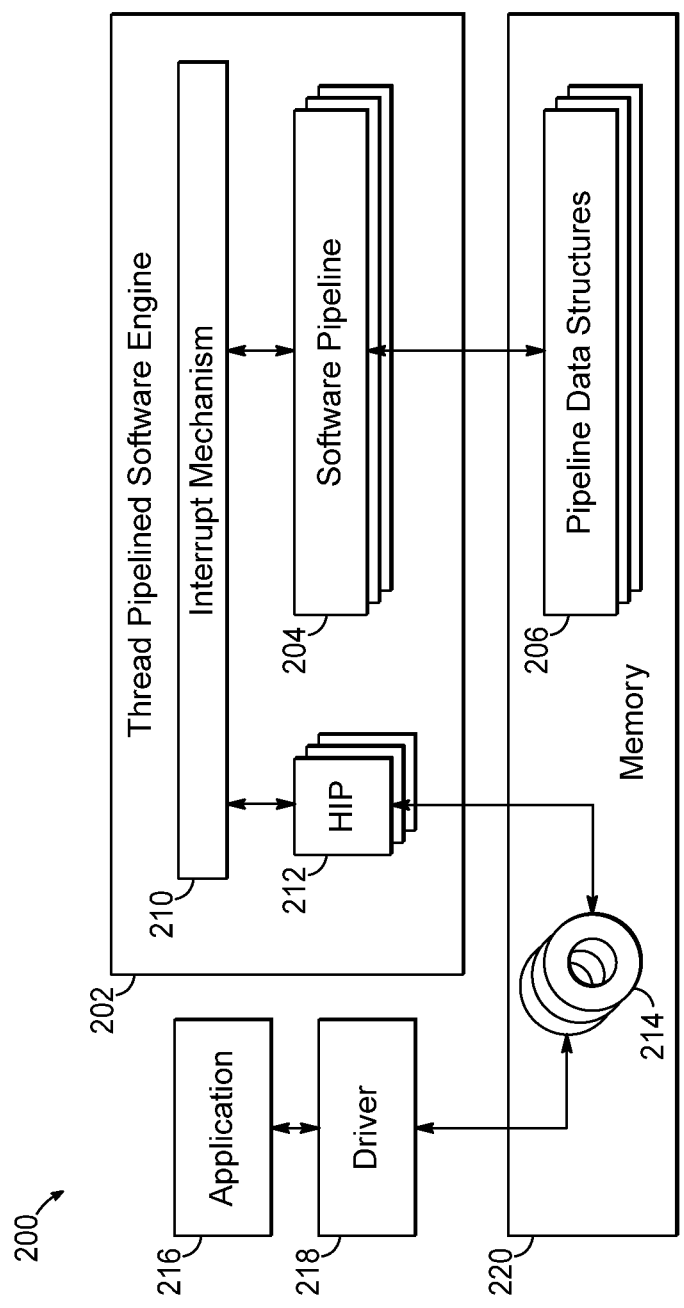
FIG. 5 is a block diagram of a thread pipelined software engine suitable for implementation in the NOC of FIG. 2.

Turning now to FIG. 5, NOC 102 may be used in some embodiments to implement a software-based pipeline. In particular, FIG. 5 illustrates an exemplary processing unit 200 incorporating a thread pipelined software engine 202 that may be used to implement and execute one or more software pipelines 204 on top of a NOC architecture. Each pipeline 204 is typically allocated one or more data structures 206 in a shared memory 208 to enable different stages of a pipeline to exchange data. Furthermore, an interrupt mechanism 210 is provided to enable stages of a pipeline to notify one another of pending work to be performed.

One or more host interface processors (HIP's) 212 are also provided in engine 202 to handle the issue of work to software pipelines 204. One or more push buffers 214 are provided to interface each HIP 212 with a software application 216 and driver 218, which are resident outside of the engine. In order to initiate work in a pipeline, a software application 216 issues requests through an appropriate driver 218 in the form of API calls, which then generates appropriate requests for the HIP and stores the requests in a push buffer 214. The HIP 212 for the relevant pipeline pulls work requests off of push buffer 214 and initiates processing of the request by the associated pipeline.

In the illustrated embodiment, and as implemented on a NOC 102, a software pipeline 204 implements a function that is segmented into a set of modules or 'stages' of computer program instructions that cooperate with one another to carry out a series of data processing tasks in sequence. Each stage in a pipeline is composed of a flexibly configurable module of computer program instructions identified by a stage 1D with each stage executing on a thread of execution on an IP block 104 of a NOC 102. The stages are flexibly configurable in that each stage may support multiple instances of the stage, so that a pipeline may be scaled by instantiating additional instances of a stage as needed depending on workload. Because each stage is implemented by computer program instructions executing on an IP block 104 of a NOC 102, each stage is capable of accessing addressed memory through a memory communications controller 106. At least one stage, moreover, is capable of sending network-address based communications among other stages, where the network-address based communications maintain packet order.

The network-address based communications, for example, may be implemented using "inboxes" in each stage that receive data and/or commands from preceding stages in the pipeline. The network-address based communications maintain packet order, and are communications of a same type which are able to flow through the same virtual channel as described above. Each packet in such communications is routed by a router 110 in the manner described above, entering and leaving a virtual channel buffer in sequence, in FIFO order, thereby maintaining strict packet order and preserving message integrity.

Each stage implements a producer/consumer relationship with a next stage. The first stage receives work instructions and work piece data through a HIP 212, carries out its designated data processing tasks on the work piece, produces output data, and sends the produced output data to the next stage in the pipeline, which consumes the produced output data from the first stage by carrying out its designated data processing tasks on the produced output data from the first stage, thereby producing output data that is subsequently sent on to a next stage in the pipeline. This sequence of operations continues to the last stage of the pipeline, which then stores its produced output data in an output data structure for eventual return through the HIP 212 to the originating application 216.

Figure 6:
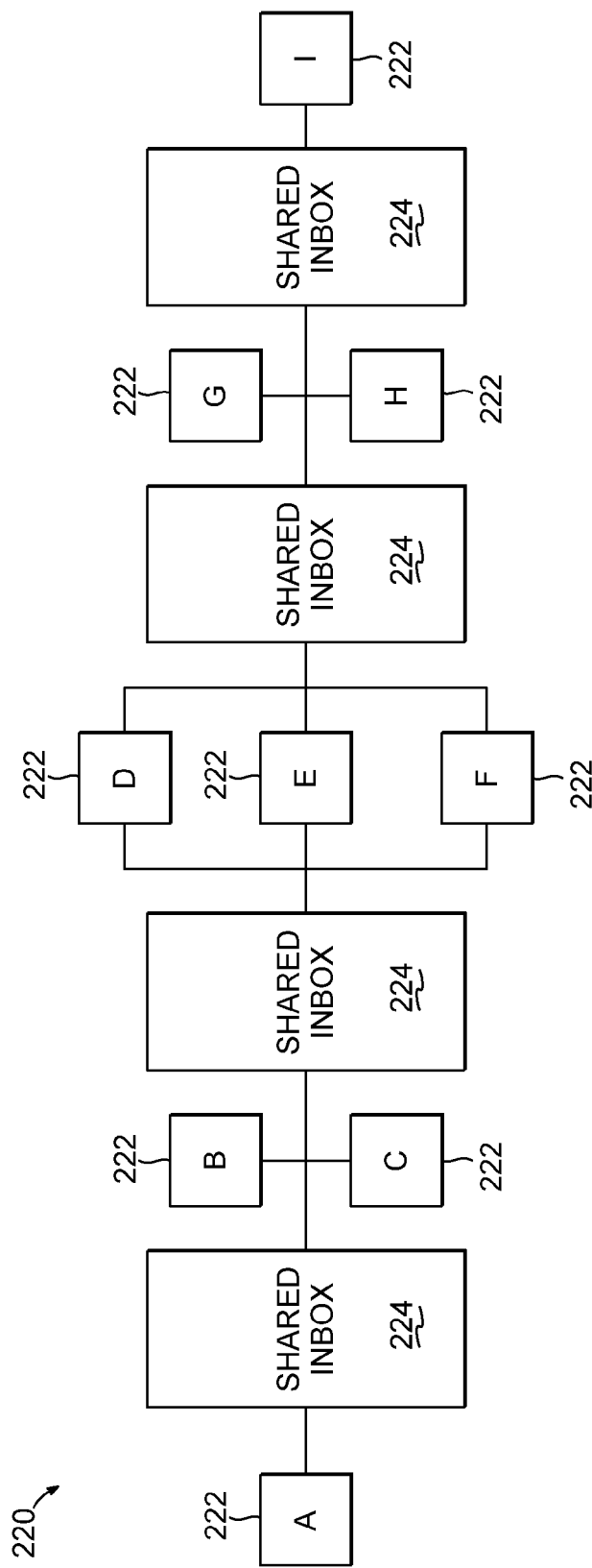
FIG. 6 is a block diagram of an exemplary software pipeline suitable for implementation utilizing shared inboxes in the NOC of FIG. 2.

The arrangement of stages in a pipeline may vary in different embodiments, as well as for performing different functions in different applications. FIG. 6, for example, illustrates an exemplary software pipeline 220 including a plurality of stage instances 222, also separately designated as instances A-I, each of which represent a thread of execution implemented on an IP block in NOC 102. The stage instances 222 are arranged in pipeline 220 into five stages, a first stage with instance A, a second stage with instances B and C, a third stage with instances D, E and F, a fourth stage with instances G and H, and a fifth stage with instance I. As can be seen from FIG. 6, instances may have a one-to-one, a one-to-many and/or a many-to-one relationship with other instances in the pipeline. Instances may operate collectively with one another in a particular stage to perform parallel tasks and share the workload, thus improving the overall throughput of the stage in performing the task. Instances in a stage may also perform different tasks from one another to enable the parallel performance of different tasks. Instances can supply data to more than one instance, while other instances may collect data and process data from multiple instances. In the exemplary embodiment, shared inboxes 224 are configured such that data may be transmitted from an instance 222 executing a first stage to a shared inbox associated with one or more instances 222 executing a second stage of the software pipeline 220.

In the illustrated embodiment, each instance 222 of each stage of a pipeline 220 is typically implemented as an application-level module of computer program instructions executed on a separate IP block on a NOC, and each stage is assigned to a thread of execution on an IP block of a NOC. Each stage is assigned a stage 1D, and each instance 222 of a stage may be assigned an identifier. HIP 212 (FIG. 5) typically sets up the pipeline 220 by configuring each stage with a desired number of instances 222, with the network location of each instance and/or a shared inbox associated with instances of a desired stage and the network location may be provided to other instances of other stages to enable each instance to send its resultant workload to a shared inbox the proper instance in the next stage. Multiple instances may be assigned to a particular stage to provide additional processing resources relative to other stages, e.g., so work flows through the pipeline as efficiently as possible, and no single stage presents a bottleneck to performance. In addition, the shared inboxes 224 facilitate balancing workload of instances 222 of a particular stage. In some embodiments, instances 222 of each stage may request one or more related data packets (i.e., a message group) from an associated shared inbox to process when the instance is low on data to process or idle, such that the tasks to be performed by the instances 222 may be processed with reduce bottleneck. In addition, in some embodiments, a particular instance 222 may provide feedback data to instances of a previous stage of the software pipeline 220 via the shared inbox connected to the previous stage instances. It will also be appreciated that workload monitoring may be performed during runtime, and that instances may be dynamically added or removed from a stage as needed for balancing the load among the stages of the pipeline.

Each stage is configured with a stage ID for each instance of a next stage, which may also include the number of instances in the next stage as well as the network location of each instance and/or the shared inbox of the stage. Configuring a stage with IDs for instances of a next stage provides the stage with the information needed to carry out load balancing across stages. Such load balancing can be carried out, for example, by monitoring the performance of the stages and instantiating a number of instances of each stage in dependence upon the performance of one or more of the stages. Monitoring the performance of the stages can be carried out by configuring each stage to report performance statistics to a separate monitoring application that in turn is installed and running on another thread of execution on an IP block or HIP. Performance statistics can include, for example, time required to complete a data processing task, a number of data processing tasks completed within a particular time period, and so on, as will occur to those of skill in the art. Instantiating a number of instances of each stage in dependence upon the performance of one or more of the stages can be carried out by instantiating, by an HIP, a new instance of a stage when monitored performance indicates a need for a new instance.

Indirect Inter-Thread Communication

NOC systems utilizing indirect inter-thread communication include shared inboxes connected to one or more threads of IP blocks in the NOC. A shared inbox may be connected to one or more threads, where the data packets received and stored in the shared inbox may be loaded into a thread for execution by an execution unit of the thread. As such, a thread connected to a shared inbox may communicate a work request to the shared inbox, and in response to the work request, the shared inbox may load one or more data packets into the requesting thread for execution by the thread. In some embodiments, the shared inbox may lock data packets related to loaded data packet, such that the related data packets may only be loaded into the requesting thread. Related data packets may be referred to as a "message group," where a message group denotes a plurality of packets including related data. The related data in the plurality of data packets may be generated by a common hardware thread, where the data output by the common hardware thread may be divided into a plurality of data packets for transmission in the NOC system.

The shared inbox may receive data packets from one or more source threads of the system, such that data packets of a message group may not be contiguously stored and/or grouped in the shared inbox. In NOC systems not utilizing embodiments of the invention, non-contiguous and/or intermixed data packets may be problematic and may lead to processing errors and/or performance bottlenecks. In NOC systems, such as NOC systems utilizing for example Direct Inter-Thread Communications, packet ordering may generally be strictly maintained to avoid these and other problems associated with inter-thread communications in a NOC system; i.e., message groups generally are stored in a thread inbox in order and contiguously.

In embodiments of the invention, packet ordering may not be strictly maintained. As discussed above, in some embodiments packets corresponding to multiple message groups may be stored in a shared inbox and messages from different message groups may be stored in various orders, such that the data packets of the message groups may be mixed. In some embodiments, the shared inbox may include a content addressable memory (CAM) configured to identify packets of a particular message group. In these embodiments, each data packet stored in the shared inbox may include a source identifier corresponding to the hardware thread from which the data packet originated. As such, the CAM may identify one or more data packets as data packets of a message group based on the source identifier included in each data packet.

Furthermore, as data packets of a message group may comprise related data, where each data packet of the message group may be required to be executed by the same respective thread. In some embodiments, the shared inbox may include lock/unlock logic which may lock all packets of a particular message group when a first data packet of the message group is loaded to a respective hardware thread, such that the remaining locked data packets of the message group may only be communicated to the respective thread, thereby preventing data packets of the message group from being communicated to different hardware threads associated with the shared inbox. As such, in these embodiments, by locking all remaining packets of a message group in response to communicating a first data packet of the message group to a respective hardware thread, the remaining data packets of the message group may be locked from being communicated to a different hardware thread. In addition, each data packet stored in a shared inbox may include an indicator which indicates whether the data packet is a first data packet (i.e., a first message) of a message group. Hence, prior to communicating a data packet to a requesting thread, some embodiments of the invention may analyze the first message indicator of the data packet to determine whether the data packet is a first message of a message group. In response to determining that the data packet is a first message of a message group, the remaining data packets of the message group may be identified based at least in part on a source identifier and the remaining messages may be locked such that they may only be communicated to the same hardware thread as the first message is communicated to.

As one or more data packets of a shared inbox may include data packets locked for communication, such that the locked data packets may only be communicated to a respective hardware thread of a plurality of hardware threads connected to the shared inbox, a CAM included in the shared inbox may identify a data packet and/or a message group as a "next available packet." In some embodiments, a pointer may be included in the shared inbox indicating the next available packet, i.e., the next data packet available (i.e., not locked) which may be transmitted to a requesting hardware thread.

Figure 7:
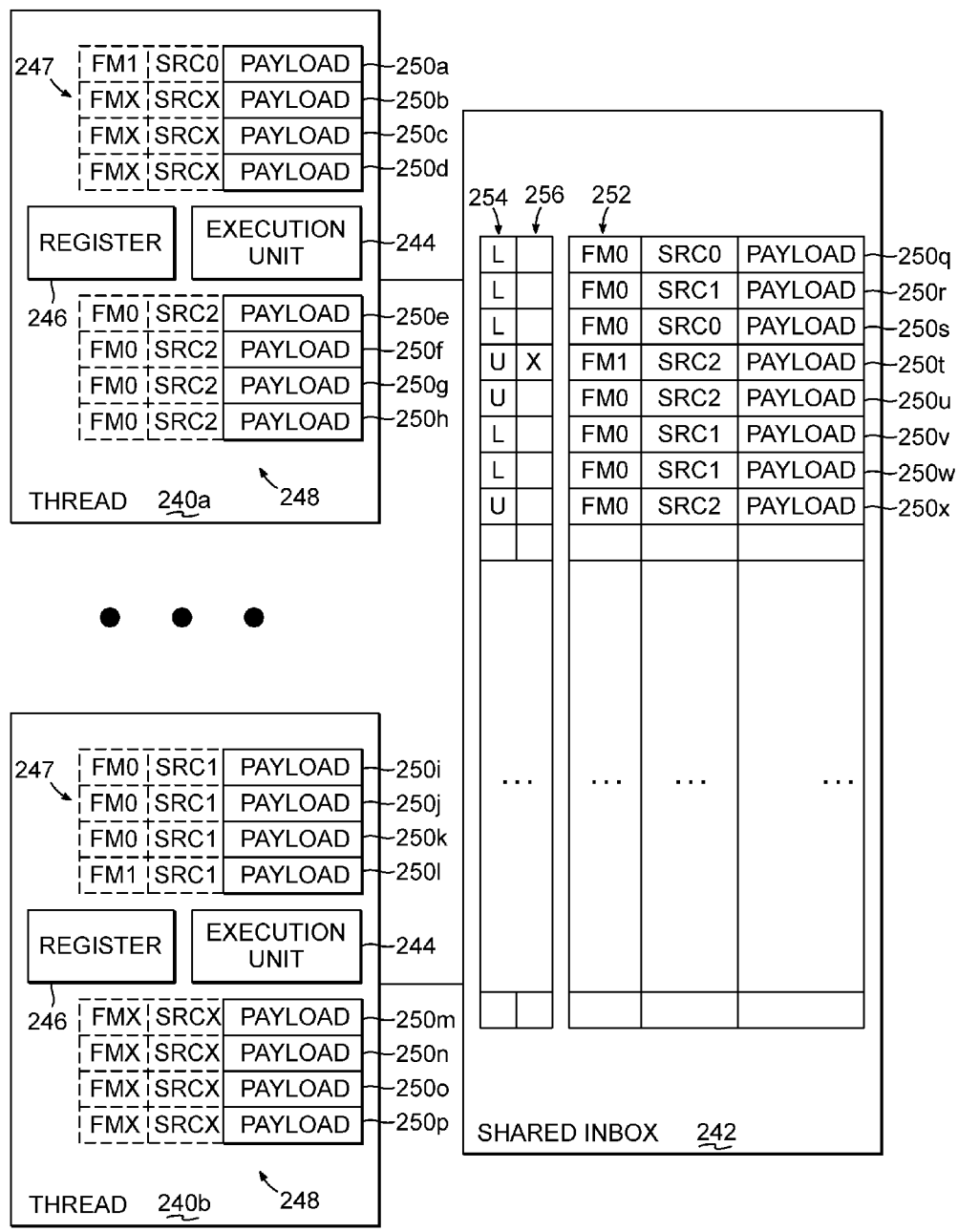
FIG. 7 is an exemplary block diagram illustrating hardware threads communicating data packets with a shared inbox of the NOC of FIG. 2.

FIG. 7 is an exemplary block diagram illustrating a plurality hardware of threads 240a, 240b coupled to a shared inbox 242 in a NOC system. As shown in FIG. 7, a first hardware thread 240a and a second hardware thread 240b each include an execution unit 244 and an execution register file 246, where data may be loaded into the execution unit 244 from the execution register file 246, and output data may be output from the execution unit 244 to the execution register file 246. In addition, each thread may include an inbox buffer 247 and/or an outbox buffer 248. Each inbox buffer 247 may store data packets 250a-d, 250i-j communicated from the shared inbox 242 over an on-chip network of the NOC system, and each outbox buffer may store data packets 250e-h, 250m-p for communication over the on-chip network to the shared inbox 242.

The shared inbox may include a data structure 252 storing one or more data packets 250q-x. The data packets 250a-x may include a source indicator which corresponds to a hardware thread from which the respective data packet originated. For example, in FIG. 7, source indicators 'SRC0', 'SRC1', 'SRC2', and 'SRCX' denote different source hardware threads from among a plurality of hardware threads. Shared inbox 242 may include a CAM such that one or more data packets may be analyzed to determine a source identifier associated therewith. In addition, the data packets 250a-x may include a first message indicator, where the indicator indicates whether the data packet 250a-x is a first message of a message group. In the example, 'FM0' indicates that the particular data packet is not a first message, and 'FM1' indicates that the particular data packet is a first message of a message group.

In addition, the shared inbox 242 may store data indicating whether a data packet 250q-x is locked or unlocked 254, and the shared inbox 242 may store a pointer 256 indicating a next available packet for communication to a requesting hardware thread 240a, 240b connected to the shared inbox 242. In the exemplary embodiment, the lock/unlock data indicates that a data packet 250q-x is unlocked with a 'U' and indicates that a data packet 250q-x is locked with a 'L.' Similarly, in the exemplary embodiment, the pointer 256 is indicated by an 'X', which indicates that the data packet 250t is the next available data packet stored in the shared inbox 242.

Data packets 250q, 250s of a first message group associated with source indicator 'SRC0' are stored in the shared inbox 242, where the first message indicator indicates that neither a first data packet 250q nor a second data packet 250s is the first message of the first message group. Accordingly, the remaining data packets 250q, 250s of the first message group stored at the shared inbox 242 are locked, as indicated by lock data 254 corresponding to the data packets 250s, 250q of the first message group. In addition, the pointer 256 of the shared inbox 242 indicates that the remaining data packets 250s, 250q of the first message group are not the next available packet stored in the shared inbox 242. As such, the remaining data packets 250s, 250q are locked in response to a first message of the first message group having been previously communicated to a connected hardware thread 240a, 240b. The first hardware thread 240a includes the first message of the first message group stored in the inbox buffer 247 associated with the first hardware thread, data packet 250a, which as shown includes a source indicator indicating that the data packet 250a originated from the hardware thread corresponding to the 'SRC0' indicator and also includes a first message indicating that the data packet 250a is the first message of the first message group. Hence, the remaining data packets 250s, 250q stored in the shared inbox 242 are locked such that the remaining data packets 250s, 250q may only be communicated to the first hardware thread 240a, where the first message 250a of the first message group was communicated.

Data packets 250r, 250v, 250w of a second message group associated with source indicator 'SRC1' are stored in the shared inbox 242, where the first message indicator of each data packet 250r, 250v, 250w indicates that none of the data packets 250r, 250v, 250w correspond to the first message of the second message group. Accordingly, the remaining data packets 250r, 250v, 250w of the second message group stored at the shared inbox 242 are locked, as indicated by lock data 254 corresponding to the data packets 250r, 250v, 250w of the second message group. In addition, the pointer 256 of the shared inbox 242 indicates that the remaining data packets 250r, 250v, 250w of the second message group are not the next available packet stored in the shared inbox 242. As such, the remaining data packets 250r, 250v, 250w are locked in response to a first message of the second message group having been previously communicated to a connected hardware thread 240a, 240b. The second hardware thread includes data packets 250i-1 including the source indicator 'SRC1' indicating that the data packets 250i-1 correspond to the second message group, including the first message of the second message group, data packet 250l. Hence the remaining data packets 250r, 250v, 250w stored in the shared inbox 242 are locked such that the remaining data packets 250r, 250v, 250w may only be communicated to the second hardware thread 240b, where the first message 250l of the second message group was communicated.

Data packets 250t, 250u, 250x of a third message group associated with source indicator 'SRC2' are stored in the shared inbox 242, where the first message indicator of a first data packet 250t indicates that the first data packet is the first message of the third message group. In addition, the pointer 256 of the shared inbox indicates that the first data packet 250t is the next available data packet stored in the shared inbox 242. As such, in response to receiving a work request from a connected hardware thread, the first data packet 250t may be communicated to the requesting hardware thread, and the remaining data packets 250u, 250x of the third message group stored in the shared inbox 242 may be locked such that the remaining data packets 250u, 250x may only be communicated to the requesting hardware thread which received the first data packet 250t. The first hardware thread 240b includes data packets 250e-h each including a source indicator 'SRC2' and corresponding to the third message group stored in the outbox buffer 248 associated with the first hardware thread 240a. As such, in this exemplary embodiment, the first hardware thread 240a corresponds to the source indicator 'SRC2.' As such, the first hardware thread may communicate the data packets 250e-h to the shared inbox 242.

Figure 8:
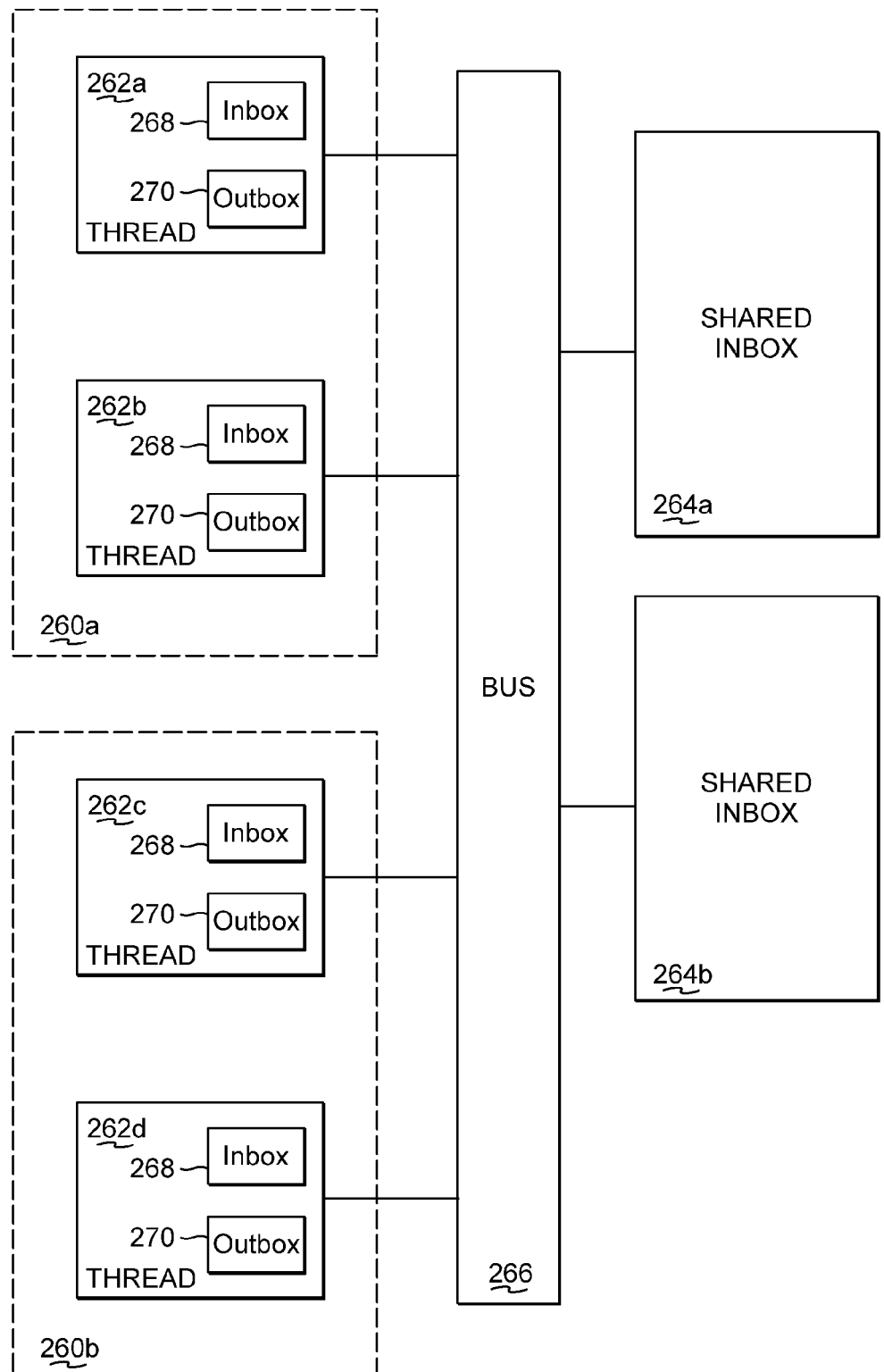
FIG. 8 is an exemplary block diagram of a plurality of pools of hardware threads associated with a plurality of shared inboxes in a NOC, such as the NOC of FIG. 2.

FIG. 8 is an exemplary block diagram illustrating a first pool 260a of hardware threads 262a, 262b coupled to a first shared inbox 264a via an on-chip network 266 and a second pool 260*b* of hardware threads 262*c*, 262*d* coupled to a second shared inbox 264*b* via the on-chip network 266. In the exemplary embodiment, the first pool 260*a* of hardware threads 262*a*, 262*b* may execute a first software thread using a first type of data, such that data packets including the first type of data may be communicated to the first shared inbox 264*a* from a source hardware thread 262*a*-*d* for processing. Similarly, the second pool 260*b* of hardware threads 260*c*, 260*d* may execute a second software thread using a second type of data, such that data packets including the second type of data may be communicated to the second shared inbox 264*b* for processing.

Furthermore, as shown in the exemplary block diagram, each hardware thread 262*a*-*d* may include an inbox buffer 268 and an outbox buffer 270 connected to the on-chip network 266 and/or one or more shared inbox 264*a*, 264*b*. As such, in the exemplary embodiment, a data packet may be communicated to a shared inbox 264*a*, 264*b* from a source hardware thread 260*a*-*d* based at least in part on the type of data included in the data packet. For example, if a data packet includes data of a first type, and the first pool 260*a* of hardware threads 262*a*, 262*b* execute software threads which utilize data of the first type, a source hardware thread 262*a*-*d* may communicate the data packet to the first shared inbox 264*a* connected to the first pool 260*a* of hardware threads 262*a*, 262*b* (i.e., destination hardware threads). In some embodiments consistent with the invention, a data packet may be selectively communicated to a respective shared inbox of a plurality of shared inboxes based on a type of data included in the data packet, and based on the type of data utilized by hardware threads associated with the respective shared inbox.

Figure 9:
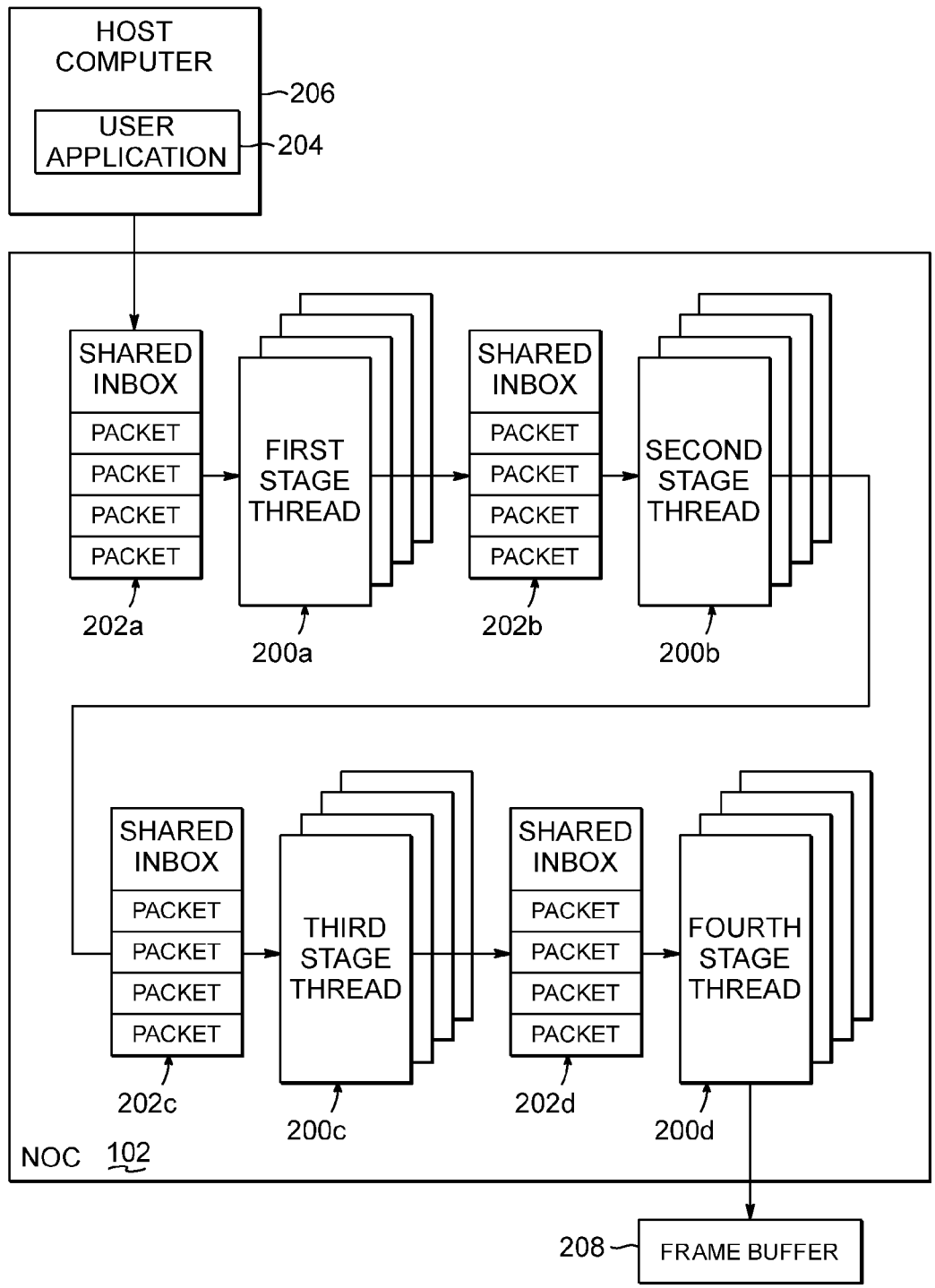
FIG. 9 is a block diagram illustrating an exemplary implementation of a software pipeline executing on a plurality of hardware threads of the NOC of FIG. 2 and communicating via a plurality of shared inboxes.

Referring to FIG. 9, which illustrates an exemplary NOC 102 consistent with embodiments of the invention, NOC 102 includes a plurality of hardware threads 200*a*-*d* executing a plurality of instances of stages of a software pipeline coupled to a plurality of shared inboxes 202*a*-*d*. NOC 102 receives software instructions from a user application 204 in a host computer 206. NOC 102 processes those instructions utilizing the plurality of hardware threads 200*a*-*d* executing the software pipeline and outputs execution results to a buffer 208.

In the example, a first pool of hardware threads 200*a* of the plurality of hardware threads 200*a*-*d* executes instances of a first stage of the software pipeline. A first shared inbox 202*a* is coupled to the first stage threads 200*a* and may communicate a data packet stored therein to a particular first stage thread 200*a* in response to receiving a request from the particular first stage thread 200*a*. The user application 204 may generate instructions and communicate the instructions to the first shared inbox 202*a* as one or more data packets, and the hardware threads 200*a* executing instances of the first stage of the software pipeline may communicate work requests to the shared inbox 202*a*, and receive data packets from the shared inbox 202*a*.

The first stage threads 200*a* may execute the received data packets from the first shared inbox 202*a* and output data packets to a second shared inbox 202*b* associated with a second pool of hardware threads 200*b* executing instances of a second stage of the software pipeline. In addition, in some embodiments, the first stage threads 200*a* may output data packets to the first shared inbox 202*a*, such that feedback data may be provided to the first stage threads 200*a* and/or data packets may be reprocessed in the event of processing errors and/or other such events.

The second pool of hardware threads 200*b* of the plurality of hardware threads 200*a*-*d* executes instances of a second stage of the software pipeline. The second shared inbox 202*b* is coupled to the second stage threads 200*b*, such that output data from the first stage threads may be communicated from the second shared inbox 202*b* to the second stage threads 200*b* for processing. The second shared inbox 202*b* may communicate a data packet to a particular second stage thread 200*b* in response to receiving a work request from the particular second stage thread 200*b* executing an instance of the second stage of the software pipeline. The second stage threads 200*b* may execute data packets received from the second shared inbox 202*b* and output data packets to a third shared inbox 202*c* associated with hardware threads 200*c* executing instances of a third stage of the software pipeline. In addition, in some embodiments, the second stage threads may output data packets to the first shared inbox 202*a* and/or the second shared inbox 202*b*, such that feedback data may be provided to the first stage threads 200*a* and/or the second stage threads 200*b* and/or data packets may be reprocessed in the event of processing errors and/or other such events.

A third subset of hardware threads 200*c* of the plurality of hardware threads 200*a*-*d* executes instances of a third stage of the software pipeline. The third shared inbox 202*c* is coupled to the third stage threads 200*c*, such that output data from the second stage threads 200*b* may be communicated from the third shared inbox 202*c* to the third stage threads 200*c* for processing. The third shared inbox 202*c* may communicate a data packet to a particular third stage thread 200*c* in response to receiving a work request from the particular third stage thread 200*c* executing an instance of the third stage of the software pipeline. The third stage threads 200*c* may process data packets received from the third shared inbox 202*c* and output data packets to a fourth shared inbox 202*d* associated with hardware threads 200*d* executing instances of a fourth stage of the software pipeline. In addition, in some embodiments, the third stage threads 200*c* may output data packets to the first shared inbox 202*a*, the second shared inbox 202*b*, and/or the third shared inbox 202*c*, such that feedback data may be provided to the first stage threads 200*a*, the second stage threads 200*b*, and/or the third stage threads 200*c* and/or data packets may be reprocessed in the event of processing errors and/or other such events.

A fourth subset of hardware threads 200*d* of the plurality of hardware threads 200*a*-*d* executes instances of a fourth stage of the software pipeline. The fourth shared inbox 202*d* is coupled to the fourth stage threads 200*d*, such that output data from the third stage threads 200*c* may be communicated from the fourth shared inbox 202*d* to the fourth stage threads 200*d* for processing. The fourth shared inbox 202*d* may communicate a data packet to a particular fourth stage thread 200*d* in response to receiving a work request from the particular fourth stage thread 200*d* executing an instance of the fourth stage of the software pipeline. The fourth stage threads 200*d* may process data packets received from the fourth shared inbox 202*d* and output data packets to a frame buffer 208. In addition, in some embodiments, the fourth stage threads 200*d* may output data packets to the first shared inbox 202*a*, the second shared inbox 202*b*, the third shared inbox 202*c*, and/or the fourth shared inbox 202*d*, such that feedback data may be provided to the first stage threads 200*a*, the second stage threads 200*b*, the third stage threads 200*c*, and/or the fourth stage threads and/or data packets may be reprocessed in the event of processing errors and/or other such events.

Figure 10:
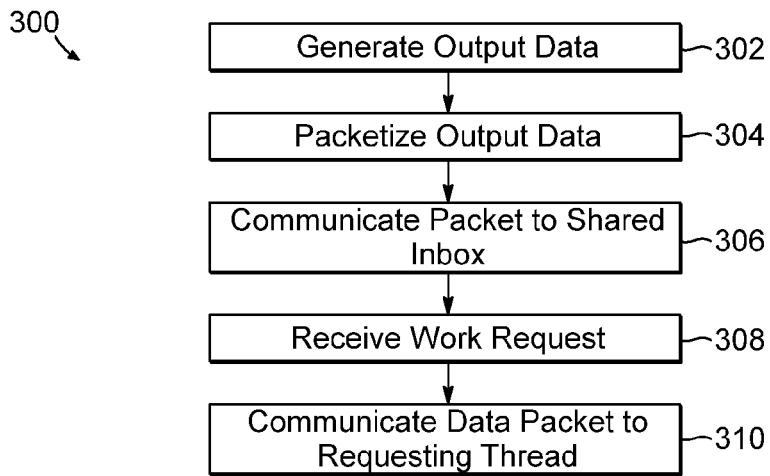
FIG. 10 is a flowchart illustrating a sequence of operations that may be performed by the shared inboxes and/or hardware threads of FIG. 7 to communicate data between a shared inbox and one or more hardware threads.

FIG. 10 provides a flowchart 300 illustrating a sequence of operations that may be performed by one or more hardware threads of a NOC system consistent with embodiments of the invention to communicate and process data in a software pipeline using one or more shared inboxes associated with one or more hardware threads of the NOC system. A source hardware thread of a plurality of hardware threads of the NOC system generates output data (block 302), and packetizes the output data into one or more data packets (block 304) for communication via an on-chip network of the NOC system. The one or more data packets are communicated over the on-chip network (block 306) to a shared inbox associated with one or more hardware threads of the plurality of hardware threads of the NOC system. The shared inbox may receive a work request from any hardware thread associated therewith (block 308), and the shared inbox may communicate a data packet to the requesting thread (block 310) in response to receiving the work request.

Figure 11:
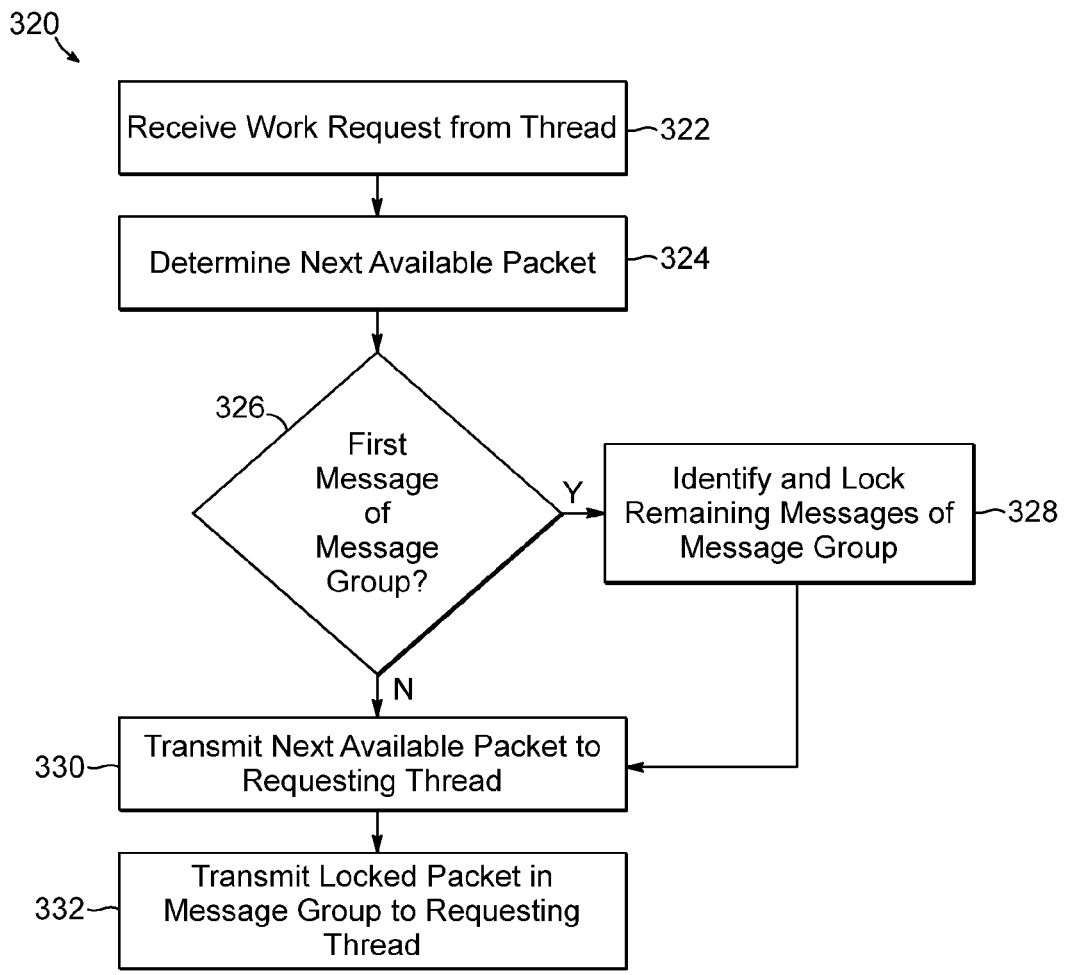
FIG. 11 is a flowchart illustrating a sequence of operations that may be performed by the shared inboxes and/or hardware threads of FIG. 7 to communicate data from a shared inbox and lock related messages stored in the shared inbox.

FIG. 11 provides a flowchart 320 illustrating a sequence of operations that may be performed by one or more shared inboxes of a NOC system coupled to one or more hardware threads to selectively communicate one or more data packets from a shared inbox to an associated hardware thread one or more data packets. A shared inbox may receive a work request from an associated hardware thread of a group of hardware threads associated with the shared inbox (block 322). A pointer of the shared inbox may indicate a next available packet for communication from the shared inbox to a requesting hardware thread, and logic included in the shared inbox may analyze the pointer to determine a next available packet stored in the shared inbox (block 324). Prior to communicating the next available packet to the requesting thread, a first message indicator included in the next available packet may be analyzed to determine whether the next available packet is a first message of a respective message group (block 326).

In response to determining that the next available packet is a first message of a respective message group ("Y" branch of block 326), the shared inbox may identify all other data packets of the respective message group stored in the shared inbox (i.e., remaining messages of the respective message group) and lock the remaining messages such that the remaining messages may be communicated only to the requesting thread (block 328). In response to determining that the next available packet is not a first message of a message group ("N" branch of block 326) and/or after locking the remaining messages of the respective message group, the next available packet may be communicated to the requesting thread (block 330). If remaining messages of the respective message group corresponding to the transmitted data packet are stored in the shared inbox, the remaining messages of the respective message group may be communicated to the requesting thread after communicating the data packet corresponding to the first message of the respective message group. As such, in these embodiments data packet order may be maintained by communicating the remaining messages of the respective message group after transmitting the first message of the respective message group to the same (i.e., the requesting) thread.

While all of the invention has been illustrated by a description of various embodiments and while these embodiments have been described in considerable detail, the applicant does not intend to restrict or in any way limit the scope of the appended claims to such detail. For example, the blocks of any of the flowcharts may be re-ordered, processed serially and/or processed concurrently without departing from the scope of the invention. Moreover, any of the flowcharts may include more or fewer blocks than those illustrated consistent with embodiments of the invention. Those skilled in the art will recognize that parallel processing computing systems generally divide a workload into a plurality of tasks that may be performed substantially in parallel. Hence, while the disclosures and drawings are discussed in a serial manner, the computing system may analyze a computing node for all redundant hardware resources substantially in parallel; moreover, the computing systems may analyze a plurality of computing nodes in the computing system substantially in parallel. In addition, while some exemplary embodiments of the invention include inbox buffers associated with each hardware thread, the invention is not so limited. For example, in some embodiments of the invention a hardware thread may not include an inbox buffer, and data packets communicated from an associated shared inbox may be stored in an execution register file and/or some other form of buffer. Furthermore, in some embodiments a shared inbox buffer of a particular hardware thread may function as a shared inbox for one or more associated hardware threads.

Moreover, embodiments of the invention may be utilized in performing various operations and/or executing various steps. For example, one process for rendering two-dimensional images from three-dimensional scenes referred to as ray tracing may be performed utilizing an embodiment of the invention. Ray tracing traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

One major drawback of ray tracing, however, is the large number of calculations, and thus processing power, required to render scenes. At the chip level, a NOC system including a plurality of hardware threads may execute a software pipeline consistent with embodiments of the invention to perform ray tracing operations. In these NOC systems, hardware-based pipelining may be employed so that certain operations that may take multiple clock cycles to perform are broken up into stages, enabling other operations to be started prior to completion of earlier operations. Multithreading may also be employed to enable multiple instruction streams to be processed in parallel by different hardware threads, thereby enabling more overall work to performed in any given clock cycle.

In general, rendering processes often may be divided into frontend and backend processes. The frontend process is used to basically build primitives for a scene to be depicted in the displayed image. A primitive is the basic geometry element used to represent an object in a scene, and in many conventional techniques, primitives are defined as triangles. Objects to be placed in a scene may be predefined and loaded during the frontend process, or objects can be built on-the-fly based upon mathematical algorithms that define the shape of a 3D object.

The frontend process typically places objects in a scene, determines and/or creates the primitives for those objects, and assigns colors or textures to each of the primitives. Once objects and primitives are placed, no movement of those objects or primitives is typically permitted.

The backend process takes the primitives and the colors or textures assigned to those primitives by the frontend process, and draws the 2D image, determining which primitives are visible from the desired viewpoint, and based upon the displayed primitives, assigning appropriate colors to all of the pixels in the image. The output of the backend process is fed to an image buffer for display on a video display.

For a physical rendering backend, the output of the frontend process, the list of primitives and their assigned colors or textures, often must be transformed into a data structure that can be used by the physical rendering backend. In many physical rendering techniques, such as ray tracing and photon mapping, this data structure is referred to as an Accelerated Data Structure (ADS).

Figure 12:
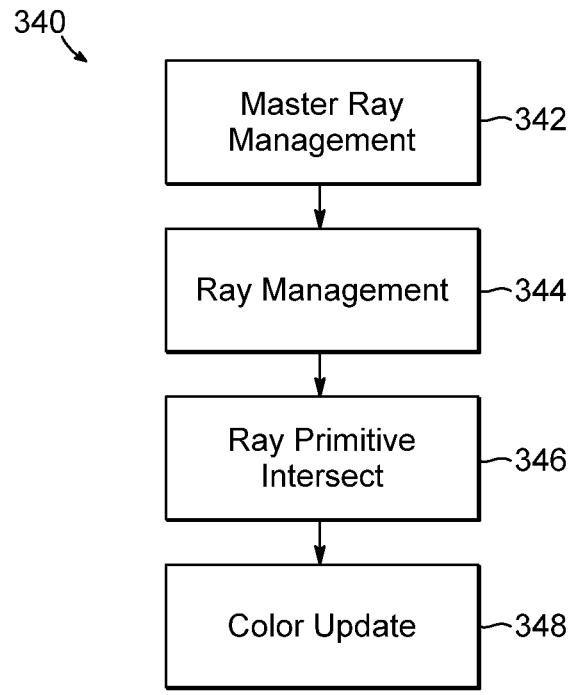
FIG. 12 is a block diagram of an exemplary implementation of a ray tracing backend that may be implemented utilizing the software pipeline, hardware threads, and shared inboxes of FIG. 8.

FIG. 12 illustrates a ray tracing implementation of a physical rendering backend 340 consistent with the invention. Backend 340 includes a master ray management module 342 that handles interfacing with the rendering front end, initiating and synchronizing all initial rays, performing performance monitoring and dynamic (or static) load balancing. One or more other ray management modules 344 functions as a slave ray manager that receives rays from the master or other slaves and traverses the ADS until determining if the ray intersects with a full leaf node or not. If not, the default background color is applied. If so, the ray is sent to a ray primitive intersect module 346, which determines the intersections between rays and primitives. A color update module 348 updates pixels in a scene based upon the intersections detected between rays and primitives. With reference to FIGS. 9 and 12, the master ray management module 342 may correspond to the first stage threads 200a, the ray management module 344 may correspond to the second stage threads 200b, the ray primitive intersect 346 may correspond to the third stage threads 200c and the color update 348 may correspond to the fourth stage threads 200d. As described above with respect to FIG. 9, the shared inboxes 202a-d may facilitate workload balancing of the hardware threads 200a-d executing instances of the stages of the software pipeline, and the shared inboxes 202a-d may also facilitate the hardware threads 200a-d communicating feedback data to one or more earlier stages in the software pipeline. For example, the ray management module 344 may communicate data packets to a shared inbox associated with hardware threads executing master the ray management module 342 such that additional rays may be initialized and synchronized. Furthermore, the hardware threads executing the ray primitive intersect module 346 may communicate data packets to the shared inbox associated with hardware threads executing the ray management module 344 and/or the master ray management module 342. It will be appreciated that a wide variety of ray tracing backend architectures may be used consistent with the invention, and as such, the invention is not limited to the particular architecture illustrated in FIGS. 9 and 12.

Figure 13:
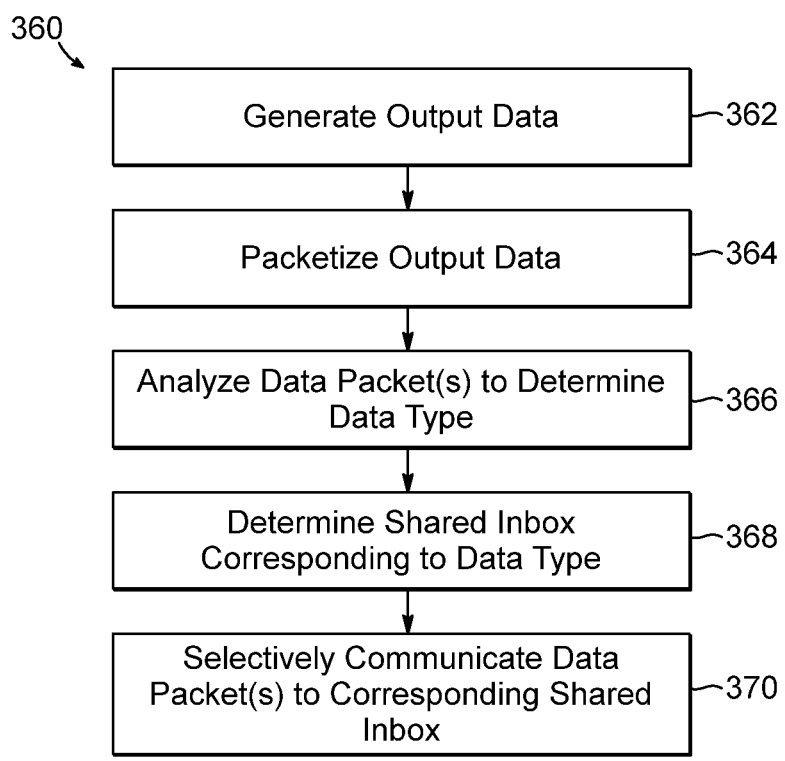
FIG. 13 is a flowchart illustrating a sequence of operations that may be performed by the shared inboxes and/or hardware threads of FIG. 7 to selectively communicate data between the shared inboxes and hardware threads.

It may be desirable in some embodiments to organize shared inboxes based upon data type. For example, FIG. 13 provides a flowchart 360 illustrating a sequence of operations that may be performed by one or more shared inboxes of a NOC system coupled to one or more hardware threads to selectively communicate one or more data packets from a source hardware thread to a particular shared inbox of a plurality of shared inboxes based on data included in the data packet consistent with some embodiments of the invention. A source hardware thread generates output data (block 362), and packetizes the output data into one or more data packets (block 364). The source hardware thread may analyze the data packets to determine a type of data included therein (block 366), and based at least in part on the data of the one or more data packets, the source hardware thread determines a particular shared inbox of a plurality of shared inboxes to communicate each data packet of the one or more data packets (block 368). In some embodiments a source hardware thread may generate a message group including a plurality of data packets, and the source hardware thread may only analyze a portion of one or more data packets of the message group to determine which particular shared inbox of the plurality to communicate the message group to. The source hardware thread may selectively communicate the one or more data packets to one or more shared inboxes corresponding to the data types of the one or more data packets (block 370).

Advantageously, shared inboxes associated with pools of hardware threads of a NOC system consistent with embodiments of the invention address workload balancing issues associated with conventional inter-thread communication architectures. Particularly, in conventional inter-thread communication architectures, data packets may be specifically addressed to a particular hardware thread of the NOC system, e.g., a destination thread must be addressed when communicating a data packet, which may lead to some hardware threads processing data while other hardware based threads sit idle. Furthermore, conventional systems may require strict packet ordering in executing a software pipeline which may cause stages of a software pipeline to stall waiting for packets to be communicated in order. Embodiments of the invention advantageously facilitate data packet communication between threads without a known destination thread utilizing a shared inbox coupled to a pool of destination hardware threads. As such, one or more data packets may be loaded to a particular destination thread of a pool of destination threads associated with a shared inbox in response to the particular destination thread requesting data packets for processing. As such, the destination thread may be unknown to a source hardware thread generating a data packet for subsequent processing, and in some embodiments, data packets may instead be addressed to a shared inbox connected to the on-chip network. Furthermore, data packet ordering may not be strictly maintained in a shared inbox consistent with embodiments of the invention. Each data packet may include a source identifier and a first message indicator, such that data packet ordering may be enforced when communicating data packets to a requesting hardware thread, but not while storing data packets in the shared inbox. Advantageously, the shared inbox may receive data packets of a plurality of message groups from a plurality of source hardware threads substantially concurrently, and the data packets may be re-grouped in response to communicating a first message of a particular message group to a hardware thread for processing by locking data packets of the particular message group in response to communicating the first message of the particular message group to the hardware thread.

Moreover, in some embodiments, some individual hardware threads may not be associated with a network address on the on-chip network, and shared inboxes associated with pools of hardware threads may be associated with network addresses on the on-chip network. As such, in some embodiments the number of possible network addresses may be reduced, and accordingly, the number of bits utilized in a data packet corresponding to a destination network address may be reduced. Accordingly, in these embodiments, reducing the amount of bits utilized in network addressing may allow more data bits in a data packet to be utilized for various other purposes, including additional bits in a payload portion. As such, the number of data packets required to stream data between hardware threads may be reduced, such reduction may correspondingly reduce network traffic and increasing efficiency in a NOC. In some embodiments, some individual hardware threads and shared inboxes may be associated with network addresses on the on-chip network. As such, in these embodiments, source hardware threads may communicate data packets to a specific destination hardware thread, and/or a shared inbox. Accordingly, in some embodiments a source hardware thread may determine whether to communicate a particular data packet to a shared inbox or directly to an inbox buffer of a destination hardware thread prior to communicating the data packet. Determining whether to communicate a particular data packet to a shared inbox or a destination hardware thread may be based at least in part on the data of the data packet and/or the source and/or destination hardware thread, including for example, an execution priority associated with data included in the data packet, an execution priority associated with the source hardware thread, a type of data included in the data packet.

In some embodiments consistent with the invention, an indirect inter-thread communication architecture of a NOC system utilizes data packets including a source identifier, a first message indicator (e.g., a first message flag), and a payload. In some embodiments, the source identifier may be automatically inserted from a hardware resource associated with a source hardware thread, including for example a process identifier and/or process information register. In addition, the source identifier may be defined and inserted into a data packet by a software thread executing on the source hardware thread. A first message indicator may be used for determining if a data packet is the start of a group of packets (i.e., the first message of a message group). A payload may utilize the remaining area of a packet and may be defined by a user application executing in the NOC system. In embodiments utilizing indirect inter-thread communication architecture, directing data packets to a plurality of shared inboxes coupled to pools of hardware threads may advantageously reduce the size of destination addressing data generally utilized in inter-thread communication architecture.

Data packets may be communicated from an outbox buffer of a source hardware thread to a shared inbox. In some embodiments, a data packet may be analyzed prior to transmission to a shared inbox to identify which shared inbox of a plurality of shared inbox the data packet should be sent to based at least in part on the data included in the data packet. As such, in some embodiments, data packets may be selectively transmitted to a particular shared inbox of a plurality of shared inboxes based at least in part on the data included in the data packet. A shared inbox may maintain a pointer indicating a next available data packet to be sent to a requesting hardware thread, and the shared inbox may include a CAM for identifying data packets in the inbox with the same source identifier as well as the next available packet to be sent. Hardware threads requesting work may request a data packet as well as lock all remaining packets having the same source identifier. The lock may be acquired by a requesting hardware thread in response to a first message of a particular message group being communicated to the requesting hardware thread. Furthermore, shared inboxes consistent with some embodiments of the invention may be implemented any number of times at various levels within a NOC system.

A data packet may be initiated by an outbox buffer and communicated to an end of a queue of a shared inbox. As other packets are communicated to hardware threads associated with the shared inbox for processing, the data packet may move up the queue. An associated hardware thread may perform a 'get' operation with an associated inbox buffer (including the source hardware thread), and the requesting hardware thread may receive the data packet in the associated inbox buffer. The requesting hardware thread may then process the data packet as required in by the implementation of the NOC system.

A receiving hardware thread may request work from a shared inbox when not busy, and the hardware thread may request the remaining messages of a message group when processing a first message of the message group. The request initiated by the hardware thread may be a 'get and lock' request and/or a 'get' request. For a 'get and lock,' the hardware thread must acknowledge the end of a message group by communicating a 'lock clear' to the shared inbox. For a 'get' request, the communicated packet is removed from the shared inbox once processed.

In some embodiments, a NOC system may communicate data packets to unique shared inboxes of the NOC system based on at least a portion of the packet data. In some embodiments, the at least a portion may include at least a portion of a payload of the data packet. As such, in these embodiments, the NOC system may utilize shared inboxes as a boundary for a pool of threads working on a common type of data. Hence, various embodiments of the invention may facilitate routing of data packets to different shared inboxes based on the type of data included in each data packet.

Advantageously, embodiments of the invention address workload balancing between hardware threads of a NOC system. In addition, embodiments of the invention address uneven workload length in NOC systems.

While the invention has been illustrated by a description of the various embodiments and the examples, and while these embodiments have been described in considerable detail, it is not the intention of the applicants to restrict or in any other way limit the scope of the appended claims to such detail. For example, the blocks of any of the flowcharts may be re-ordered, processed serially and/or processed concurrently without departing from the scope of the invention. Moreover, any of the flowcharts may include more or fewer blocks than those illustrated consistent with embodiments of the invention.

For example, while the invention has been described in considerable detail as including shared inboxes and indirect inter-thread communication, the system is not so limited. Embodiments of the invention may be utilized in NOC systems including direct inter-thread communication architecture in combination therewith. In these embodiments, data packets may be communicated directly to a desired destination hardware thread and/or a shared inbox associated with a pool of destination hardware threads. In some embodiments, a source hardware thread may analyze a data packet prior to communication over an on-chip network of a NOC system to determine whether to transmit the data packet directly to an inbox buffer associated with a particular hardware thread or whether to transmit the data packet to a shared inbox associated with a pool of destination hardware threads, and the determination of where to communicate the data packet may be based at least in part on the data included in the data packet, a priority of a software thread executing on the hardware thread, a workload capacity associated with one or more destination hardware threads, a type of data included in the data packet, an opcode included in the data packet, and or other such routing criteria.

Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A method for communicating data in a network on chip (NOC) processing unit that includes a plurality of nodes, each node including a router and an integrated processor block, each integrated processor block including at least one hardware thread, and each hardware thread executing an instance of a stage of a plurality of stages of a software pipeline, wherein the routers of each node are coupled together in an on-chip network, the method comprising:

generating output data from a source hardware thread executing an instance of a first stage of the software pipeline;

packetizing the output data into at least one data packet, each data packet of the at least one data packet including a source identifier associated with the source hardware thread and a first message flag indicating whether the data packet is a first message of a message group, wherein the at least one data packet includes a first data packet having a first message flag indicating that the first data packet is the first message of the message group;

communicating the at least one data packet from the source hardware thread to a shared inbox associated with a pool of destination hardware threads executing instances of a second stage of the software pipeline among the plurality of hardware threads; and in response to a request from any destination thread among the pool of hardware threads, communicating the first data packet from the shared inbox to an inbox buffer associated with the requesting destination thread and locking data packets stored in the shared inbox having the same source identifier as the first data packet such that the locked data packets can only be communicated to the inbox buffer associated with the requesting destination thread.

2. A method for communicating between a plurality of hardware threads disposed in a plurality of nodes in a network on chip (NOC) processing unit, the method comprising:

communicating a first data packet and a second data packet from a source hardware thread among the plurality of hardware threads to a shared inbox connected to a pool of destination hardware threads among the plurality of hardware threads, wherein each destination hardware thread of the pool is configured to process data packets stored at the shared inbox, wherein the first and second packets are of a respective message group and the first data packet is a first message of the respective message group;

in response to a request from any destination hardware thread among the pool of destination hardware threads, communicating the first data packet from the shared inbox to an inbox buffer associated with the requesting destination hardware thread; and determining that the second data packet is of the respective message group and locking the second data packet such that the second data packet can only be communicated from the shared inbox to the inbox buffer associated with the requesting destination hardware thread.

3. The method of claim 2, wherein the shared inbox includes a pointer indicating a next available packet stored in the shared inbox, and wherein communicating the first data packet from the shared inbox to the inbox buffer associated with the requesting destination hardware thread is in response to determining that the first data packet is the next available packet in the shared inbox based on the pointer.

4. The method of claim 2, wherein each data packet includes a source identifier corresponding to a source hardware thread of the plurality of hardware threads from which the data packet is communicated, each data packet includes an indicator indicating whether the data packet is a first message of a message group, the first data packet and the second data packet include the same source identifier corresponding to the source hardware thread, the indicator of the first data packet indicates that the first data packet is the first message of the respective message group and determining that the second data packet is of the respective message group includes determining that the second data packet is of the respective message group based on the source identifier included in the second data packet.

5. The method of claim 4, further comprising:

analyzing the indicator of the first data packet to determine whether the first data packet is the first message of the respective message group, and wherein locking the second data packet is in response to determining that the first data packet is the first message of the respective message group.

6. The method of claim 4, further comprising:

communicating the second data packet to the requesting destination hardware thread after communicating the first data packet to the requesting destination thread in response to a request from the requesting destination thread.

7. The method of claim 2, wherein the shared inbox stores a plurality of data packets including the first data packet and the second data packet, the shared inbox is a first shared inbox associated with a first data type, each data packet includes a payload, and the first data packet is communicated to the first shared inbox in response to determining that the payload of the first data packet is of the first data type.

8. The method of claim 7 further comprising:

communicating a third data packet from the source hardware thread to a second shared inbox associated with a second data type and associated with a second pool of destination hardware threads among the plurality of hardware threads in response to determining that the payload of the third data packet is of the second data type.

9. The method of claim 2, further comprising communicating a third data packet from the requesting destination thread to a second shared inbox associated with a second pool of second destination hardware threads among the plurality of hardware threads.

10. The method of claim 9, further comprising:

in response to a request from any second destination hardware thread among the second pool of second destination hardware threads, communicating the third data packet from the second shared inbox to an inbox buffer associated with the requesting second destination hardware thread.

11. The method of claim 2, further comprising:

prior to communicating the first data packet to the shared inbox, automatically inserting a source identifier corresponding to the source hardware thread in the first data packet.

12. A circuit arrangement comprising:

a plurality of hardware threads coupled to one another in a network on a chip (NOC) arrangement, the plurality of hardware threads including a source hardware thread and a pool of destination hardware threads each including an execution unit;

a shared inbox including a memory coupled to the pool of hardware threads and configured to receive a first inter-thread data packet from the source hardware thread and communicate the first inter-thread data packet to any destination hardware thread among the pool of hardware threads in response to receiving a request from the requesting destination hardware thread, wherein each destination hardware thread of the pool is configured to process inter-thread data packets stored at the shared inbox;

wherein the shared inbox stores a plurality of data packets including the first data packet, wherein the first data packet is the first message of a respective message group, wherein the shared inbox is further configured to receive a second data packet of the respective message group from the source hardware thread, and wherein the shared inbox is configured to lock the second data packet based upon the second data packet being of the respective message group such that the second data packet can only be communicated to the requesting destination hardware thread.

13. The circuit arrangement of claim 12, wherein the shared inbox includes a pointer indicating a next available packet stored in the shared inbox, and wherein the shared inbox communicates the first data packet to the requesting destination hardware thread in response to determining that the first data packet is the next available packet in the shared inbox based on the pointer.

14. The circuit arrangement of claim 12, wherein each data packet includes a source identifier corresponding to a source hardware thread of the plurality of source hardware threads from which the data packet is communicated, each data packet includes an indicator indicating whether the data packet is a first message of a message group, and the indicator of the first data packet indicates that the first data packet is the first message of the respective message group, and wherein the first data packet and the second data packet include the same source identifier corresponding to the source hardware thread, and the shared inbox is configured to lock the second data packet in response to communicating the first data packet to the requesting destination hardware thread based upon the first data packet and the second data packet including the same source identifier corresponding to the source hardware thread.

15. The circuit arrangement of claim 14, wherein the shared inbox is further configured to analyze the indicator of the first data packet prior to communicating the first data packet to determine whether the first data packet is the first message of the respective message group and lock the second data packet in response to determining that the first data packet is the first message of the respective message group.

16. The circuit arrangement of claim 14, wherein the shared inbox is further configured to communicate the second data packet to the requesting destination hardware thread after communicating the first data packet to the requesting destination hardware thread in response to a request from the requesting destination hardware thread.

17. The circuit arrangement of claim 12, wherein the shared inbox stores a plurality of data packets including the first data packet and the second data packet, the shared inbox is a first shared inbox associated with a first data type, the pool of destination hardware threads is a first pool of destination hardware threads configured to process data of the first data type, each data packet includes a payload, and the source hardware thread is configured to communicate the first data packet to the first shared inbox in response to determining that the payload of the first data packet is of the first data type.

18. The circuit arrangement of claim 17, wherein the plurality of hardware threads includes a second pool of destination hardware threads configured to process data of a second type, the circuit arrangement further comprising:
a second shared inbox including a memory coupled to the second pool of destination hardware threads, wherein the source hardware thread is configured to communicate a third data packet to the second shared inbox in response to determining that the payload of the third data packet is of the second data type.

19. The circuit arrangement of claim 12, wherein the pool of destination hardware threads is a first pool of first destination hardware threads, and the plurality of hardware threads includes a second pool of second destination hardware threads, the circuit arrangement further comprising:
a second shared inbox including a memory coupled to the first and second pool of destination hardware threads and configured to receive a third data packet from any of the first destination hardware threads and communicate the third data packet to any requesting second destination thread in response to receiving a request from the requesting second destination hardware thread.

20. The circuit arrangement of claim 12, wherein the source hardware thread is configured to automatically insert a source identifier corresponding to the source hardware thread in the first data packet prior to transmitting the first data packet to the shared inbox.

21. The circuit arrangement of claim 12, wherein the memory of the shared inbox comprises a content addressable memory.

22. The circuit arrangement of claim 12, where in the memory of the shared inbox includes a data structure storing data that indicates whether a data packet stored in the shared inbox is locked.

* * * * *